United States Patent
Burrows et al.

(10) Patent No.: US 6,451,384 B1
(45) Date of Patent: Sep. 17, 2002

(54) METHOD OF TEMPERING FIBERBOARD DOORSKIN USING LIQUID THERMOSETS

(75) Inventors: Benjamin E. Burrows, St. Louis Park; Albert M. Giorgini, Lino Lakes, both of MN (US)

(73) Assignee: H.B. Fuller Licensing & Financing Inc., St. Paul, MN (US)

(*) Notice: Subject to any disclaimer, the term of this patent is extended or adjusted under 35 U.S.C. 154(b) by 0 days.

(21) Appl. No.: 09/917,544

(22) Filed: Jul. 27, 2001

(51) Int. Cl.⁷ .............................. B05D 3/02; B05D 7/08
(52) U.S. Cl. ...................................... 427/393
(58) Field of Search .......................... 427/393

(56) References Cited

U.S. PATENT DOCUMENTS

| | | | |
|---|---|---|---|
| 4,009,073 A | 2/1977 | Pozzo et al. | 162/132 |
| 4,227,965 A | 10/1980 | Luszczak | 162/13 |
| 4,517,240 A | 5/1985 | Tracton et al. | 427/370 |
| 4,940,741 A | 7/1990 | De Wacker et al. | 524/47 |
| 5,344,484 A * | 9/1994 | Walsh | 106/201 |
| 5,367,040 A | 11/1994 | Teodorczyk | 427/339 |
| 5,603,881 A | 2/1997 | Hanna | 264/123 |

FOREIGN PATENT DOCUMENTS

| | | | |
|---|---|---|---|
| CA | 2128919 | | 7/1994 |
| WO | WO 98/32600 | * | 7/1998 |
| WO | WO 98/56991 | * | 12/1998 |

* cited by examiner

*Primary Examiner*—Erma Cameron
(74) *Attorney, Agent, or Firm*—Bin Su

(57) ABSTRACT

The invention is directed to a method of tempering fiberboard that includes applying a substantially solvent-free, liquid tempering composition on at least one surface of the fiberboard and curing the tempering composition. The tempering composition includes at least one thermoset material such as one-part moisture cure polyurethane. The tempered fiberboard can be used directly as doorskin.

21 Claims, No Drawings

METHOD OF TEMPERING FIBERBOARD DOORSKIN USING LIQUID THERMOSETS

FIELD OF THE INVENTION

The invention is directed to a method of tempering fiberboard with a substantially solvent-free liquid tempering composition. In particular, the invention is directed to a method of tempering fiberboard with a substantially solvent-free liquid tempering composition comprising at least one thermoset material.

BACKGROUND OF THE INVENTION

Fiberboard is typically manufactured from cellulosic fibers such as wood fibers. The principal processes for the manufacture of fiberboard include "wet" processes, "dry" processes and "wet-dry processes", wherein the cellulosic fibers based on wood products e.g., wood fibers, chips, flakes, dust, etc. undergo several steps to form an integral consolidated structure, e.g., a board or a panel, under heat and pressure. A post-treatment of the basic board to further bind and reinforce the surface fiber, known as tempering, is often carried out using various drying or tempering oils followed by heat curing or baking in an oven at about 250° F. or greater for several hours to cure the tempering oil. To date, the most commonly used tempering material or tempering oil is linseed oil due to its low viscosity and low cost. The use of linseed oil, however, requires an additional heating step to cure, which inevitably increases both the cost and the time associated with producing the fiberboard. Because linseed oil is a mixture of several components having different molecular weights, it also tends to give off volatile organic component (VOC), e.g., low molecular weight organic components during the heat curing, which is environmentally undesirable.

SUMMARY OF THE INVENTION

In one aspect, the invention features a method of tempering fiberboard. The method includes (a) applying a substantially solvent-free, liquid tempering composition on at least one surface of the fiberboard, and (b) curing the tempering composition. The tempering composition includes at least one thermoset material and has a viscosity at application temperature sufficiently low to allow the composition to wet out the surface and penetrate into the fiber structure of the fiberboard. The tempered fiberboard exhibits door skin cleavage strength of at least about 8 lb.

In one embodiment, the tempering composition is applied to both the face surface and the back surface of the fiberboard.

In some embodiments, the tempering composition comprises one-part moisture cure polyurethane prepolymer that can be cured at ambient conditions, e.g., ambient temperature and relative humidity, such that the heat-curing step required by the conventional tempering processes is not needed.

In another aspect, the invention features a tempered fiberboard manufactured by an above-described method.

In some embodiments, the fiberboard is tempered by a tempering composition including one-part moisture cure polyurethane prepolymer such that, upon cure, the tempered fiberboard exhibits either comparable or stronger surface and internal fiber bonds relative to the fiberboard tempered with linseed oil. In one embodiment, the tempered fiberboard exhibits door skin cleavage strength of at least about 8 lb. In another embodiment, the tempered fiberboard exhibits its door skin cleavage strength of at least about 9 lb. In other embodiments, the tempered fiberboard exhibits door skin cleavage strength of at least about 10 lb. The tempered fiberboard also exhibits a tape pull value of at least about 22 lb.; a cross hatch adhesion rating of at least 3, preferably, at least 4; and percentage substrate failure (% substrate failure) of from about 33% to about 100%.

The tempering composition of the invention contains a very low content of volatile organic component, preferably, no greater than about 5.0 g/l. Hence, the method of the invention can proceed without emitting volatile organic components (VOC) that are associated with the use of linseed oil in the conventional tempering processes.

The method of invention can also proceed without the need to heat or bake the tempering composition to achieve cure, thereby saving the energy cost and the time associated with manufacturing the tempered fiberboard. More surprisingly, by using the tempering composition of the invention, the tempered fiberboard, even cured at lower temperature, e.g., at ambient temperature, exhibits stronger surface and internal fiber bond strengths relative to the linseed oil tempered fiberboard.

DETAILED DESCRIPTION OF THE INVENTION

The tempering composition includes at least one thermoset material and is substantially solvent free. That is, the tempering composition does not contain water and does not contain any substantial amount, e.g., greater than about 10 wt % and in some cases, greater than about 5 wt %, based on the total weight of the tempering composition, of organic solvent(s). Preferably the tempering composition is a 100% solids liquid. The tempering composition is formulated such that at application temperature it wets out the surface(s) of the fiberboard, and preferably penetrates into the fiber structure of the fiberboard. When the tempering composition is applied on at least one surface of the fiberboard, the desirable average penetration depth into the fiberboard is preferably from about 0.01 inch to about 0.02 inch, more preferably about 0.015 inch.

The tempering composition can be formulated to have a viscosity suitable for the type of application being used. Preferably, the viscosity of the tempering composition is such that the tempering composition does not form an appreciable coating film on the surface(s) of the fiberboard. Preferably, the tempering composition is formulated to have a viscosity of no greater than about 10,000 cps, more preferably no greater than about 3,000 cps, most preferably no greater than about 500 cps at 77° F.

Useful thermoset materials include, e.g., two-part epoxy resins, two-part polyurethane, two-part acrylates, moisture cure thermoset resins and UV curable resins.

Moisture cure thermoset resins are thermoset resins that can be cured by contacting with atmospheric moisture at ambient temperature. Moisture cure thermoset resins preferably are 100% solids liquid at ambient temperature. Useful moisture cure thermoset resins include, e.g., alkoxy, acetoxy, oxyamino silane terminated polyethers and polyether urethanes; alkyl siloxane polymers crosslinked with alkoxy, acetoxy, and oxyamino organo functional silanes, or combination thereof; moisture curable isocyanate functional polyoxyalkaline polymers and polyalkaline polymers; thiol functional polymers and oligomers such as polyethers, polyesters, polyether urethanes and polythioethers; hydroxy-terminated polybutadiene; hydroxy-terminated acrylic polyols; and amine-terminated polyethers. Preferred moisture cure thermoset resins include one-part moisture cure polyurethane.

Preferred one-part moisture cure polyurethane includes an isocyanate terminated prepolymer that includes the reaction product of at least one isocyanate compound and at least one dihydroxy polyol. Examples of useful dihydroxy polyols include polyester polyols, polyether polyols, polyalkylene polyols, and mixtures thereof.

The one-part moisture cure polyurethane preferably has a viscosity of no greater than about 15,000 cps at 77° F. and a weight average molecular weight (Mw) of no greater than about 3,000.

The tempering composition may further include at least one viscosity modifier to reduce the viscosity of the composition. Suitable viscosity modifiers exhibit low viscosity and a flash point of greater than about 100° F., more preferably greater than about 250° F. Suitable viscosity modifiers are preferably liquid at ambient temperature and do not contain any functional groups including e.g., hydroxyl, amine, carboxyl, or thiol groups, which would react with the isocyanate groups in the polyurethane chain. The viscosity modifier preferably has a viscosity of no greater than about 200 cps, more preferably from about 10 cps to about 200 cps at 77° F.

Examples of useful viscosity modifiers include mineral oils; vegetable oils; hydrocarbon oils that are low in aromatic content and are paraffinic or naphthenic in character; epoxidized soya oil; liquid resins; phthalate esters such as dimethyl phthalate (DMP), diethyl phthalate (DEP), dibutyl phthalate (DBP), di-(2-ethylhexyl)phthalate (DOP), di-(2-ethylhexyl) terephthalate (DOTP) and stabilized di-(2-ethylhexyl)terephthalate (DOTP-CA); benzoate plasticizers; triacetin; tripropionin; di-2-ethylhexyl adipate; and mixtures thereof. Commercially available viscosity modifiers include Kaydol™ White Mineral Oil from Witco Corp. (New York, N.Y.); Eastman TXIB Plasticizer and DIOP from Eastman Chemical Company (Kingsport, Tenn.); and Santicizer 160 from Ferro Corp (Bridgeport, N.J.).

The viscosity modifier may be present in the tempering composition in an amount effective to reduce the viscosity of the tempering composition such that the composition can effectively wet out the surface(s) and preferably penetrate into the fiber structure of the fiberboard. Preferably, the viscosity modifier is present in an amount of no greater than about 75 wt %, and more preferably from about 30 wt % to about 60 wt %, based on the total weight of the composition.

The tempering composition may also include at least one catalyst to accelerate the curing speed without adversely affecting any other properties of the tempered fiberboard. Examples of useful catalysts include those that contain ether and morpholine functional groups, e.g., 2,2-dimorpholinoethyl ether and di(2,6-dimethyl morpholinoethyl)ether; 4,4'-(oxydi-2,1-ethanediyl)bis-morpholine; tertiary amine; organo tin, zinc and bismuth catalysts such as dibutyl tin dilaurate, dibutyl tin diacetate and bismuth octoate, and mixtures thereof. Commercially available catalysts include 4,4'-(oxydi-2,1-ethanedyl)bis-morpholine know as Jeffcat™ DMDEE from Huntsman Corp. (Houston, Tex.), Dabco BL-19, Dabco T-9 and Dabco T-12 from Air Products, (Allentown, Pa.), and Coscat 83 from Caschem (Bayonne, N.J.).

The catalyst is present in an amount effective to accelerate the rate of cure and also to optimize the rate of cure with the desired work life of an applicator. The work life of the applicator is the period in which the tempering composition can stay on the applicator before it becomes too difficult to be applied to the surface(s) of the fiberboard due to the moisture cure reaction of the exposed material. Preferably the catalyst is present in an amount of no greater than about 0.5 wt %, more preferably from about 0.05 wt % to about 0.5 wt %, based on the total weight of the composition.

The tempering composition may also include other additives such as wetting agents, surfactants, defoamers and combination thereof.

The tempering composition can be prepared by conventional processes known in the art. The tempering compositions that include one-part moisture cure polyurethane can be prepared by first preparing the polyurethane prepolymer, also known as isocyanate-terminated polyurethane prepolymer, and then blending the prepolymer with other optional ingredient(s).

The isocyanate-terminated polyurethane prepolymer is typically prepared by reacting at least one polyol with at least one polyfunctional isocyanate compound at an elevated temperature of typically between about 77° F. and about 180° F. The polyol may first be introduced into a reaction vessel, heated to reaction temperature and dried to remove ambient moisture absorbed by the polyol. The polyfunctional isocyanate compound is then added to the reactor. The polyol is generally reacted with the isocyanate compound at stoichoemetic ratio depending on the hydroxy (OH) and isocyanate (NCO) functionality of the reactants. Typically the reactants are reacted at a ratio which results in a reaction between isocyanate groups and hydroxy groups leaving essentially no residual hydroxy functionality. Typically, the reaction between the polyol and the isocyanate compound is conducted at a NCO/OH ratio of at least about 1.8, preferably from about 2 to about 20 to obtain the desired prepolymer. Typically, the prepolymer is titrated to measure residual concentration of isocyanate using ASTM D-2572-80 "Standard Method for Isocyanate Group and Urethane Materials or Prepolymers" to determine the completion of the reaction.

Alternatively, the tempering composition can be made by preparing the isocyanate-terminated polyurethane prepolymer together with any other optional ingredient(s), such as viscosity modifier(s) and/or catalyst(s). Thus, any optional ingredient(s) can be added prior to, during, or after the formation of the prepolymer to obtain a tempering composition. The tempering composition has % NCO by weight of preferably from about 1% to about 15%, more preferably from about 5% to about 10%, based on the total weight of the composition.

Fiberboard to be tempered includes any board that is fabricated from wood based products and consolidated to form a structure, e.g., a flat board or a panel under heat and pressure. Wood products include, e.g., fibers, chips, flakes, dust, powders, and combination thereof. Examples of suitable fiberboard include hardboard, usually defined as having a specific gravity of about 1 or greater or having a density of at least about 55 lb/ft$^3$; medium density fiberboard (or semi-hardboard), usually having a density range of from about 5 lb/ft$^3$ to about 50 lb/ft$^3$; and low density fiberboard having a density of from about 9 lb/ft$^3$ to about 25 lb/ft$^3$. Preferred fiberboard includes medium density fiberboard made from wood fibers. The fiberboard may be a flat board or may be formed in desirable shapes and dimensions depending on the intended end use.

Fiberboard is used in a variety of applications including, e.g., as doorfacing, or doorskin and siding. Fiberboard used as doorskin may be pressed into a pre-selected decorative shape, typically at a thickness of about one-eighth of an inch and a specific gravity of from about 0.99 to about 1.05, and then secured to a door core after tempering. The doorskin includes at least one face surface and at least one back surface. The face surface is the surface that may be further painted, varnished or laminated with a decorative and/or protective coating, if desired, before exposure to the exterior environment. The back surface is the surface that is connected to the door core after tempering. The face surface of the doorskin preferably has better surface quality such as stronger surface fiber bond such that the surface fiber is not easily peeled off and that any secondary coating, e.g., a top coating e.g., paint, finish, and laminate is not easily removable. It is also desirable that the back surface has, in addition to strong surface fiber bond, stronger internal bond strength so that the doorskin, once bonded to the door core, does not break apart easily due to poor internal bond strength of door fibers.

The tempering composition can be applied to one or more surface(s) of the fiberboard using a variety of application techniques including, e.g., roll coating, curtain coating, spray, impregnating, and combination thereof. For fiberboard that is used as doorskin, the tempering composition is preferably applied on at least the back surface of the fiberboard, more preferably the tempering composition is applied on both the face surface and the back surface of the fiberboard.

The tempering composition can be applied at ambient conditions such as ambient temperature of from about 55° F. to about 80° F., preferably from about 70° F. to about 77° F. and ambient relative humidity of from about 10% to about 70%, preferably from about 45% to about 55%. As tempering is a post treatment that follows the consolidation step under heat and pressure, once it is released from the press for consolidation, the fiberboard is usually at a relatively high processing temperature e.g., at least about 250° F., which is known as out-of-press temperature. The tempering composition of the invention can be formulated such that it can be applied on the fiberboard and cured while the fiberboard is still hot, e.g., as soon as it is released from the consolidation press and moved to the tempering zone.

The amount of the tempering composition to be applied to the fiberboard varies depending upon a variety of factors including, e.g., the desired penetration depth, the desirable properties of the tempered fiberboard, etc. Preferably, the tempering composition is applied in an amount effective to achieve the desired surface quality of the tempered fiberboard at the lowest cost. Useful application include applying the tempering composition on at least one surface of the fiberboard in an amount of at least about $1.0 \, g/ft^2$, preferably from about 1.5 $g/ft^2$ to about 5.0 $g/ft^2$. The tempering composition can be applied on the face surface of the fiberboard preferably in an amount of from about 1.5 $g/ft^2$ to about 3.0 $g/ft^2$, and on the back surface of the fiberboard preferably in an amount of from about 4.0 $g/ft^2$ to about 5.0 $g/ft^2$.

The tempering composition can be cured by contacting moisture at various conditions depending on specific formulations. A variety of methods can be used to contact the tempering composition with moisture including, e.g., exposing the composition to ambient moisture; contacting the composition with moisture in the form of a spray, mist, fog or a combination thereof, placing the composition in a chamber with high humidity (e.g., greater than about 75% relative humidity), and combinations thereof. Where the tempering composition comprises one-part moisture cure polyurethane, the tempering composition can be cured at application temperature such as from ambient temperature to out-of-press temperature, preferably from ambient temperature to about 150° F. depending on the production line. Preferably, the tempering composition is formulated to be curable at ambient conditions after application to the fiberboard, i.e., without heat cure or baking as required by conventional tempering processes.

Upon cure, the tempering composition is integrally cured into the fiber structure of the fiberboard such that the tempered fiberboard exhibits much stronger surface bond strength and internal bond strength relative to the un-tempered fiberboard. The tempered fiberboard also exhibits comparable or stronger surface bond strength and internal bond strength relative to a conventional linseed oil tempered fiberboard.

As the tempered fiberboard exhibits enhanced surface properties that are either equal to or better than the conventional linseed oil tempered fiberboard, it can be used directly as doorskin without the need for further surface treatment such as paint, laminate, etc. before exposing to the exterior environment. The surface(s) of the tempered fiberboard also exhibit very good adhesive bondability to secondary or top coating such that the face surface of the fiberboard forms a strong adhesive bond to top coating material, and the back surface of the fiberboard forms strong adhesive bonding with the door core.

The invention is further illustrated by the following non-limiting examples. All the parts, percentages, ratios, amounts are by weight except otherwise specified.

EXAMPLES

Testing Methods

Doorskin Cleavage Test 5 mils of RK 8490, a polyvinyl acetate adhesive from H. B. Fuller Company (St. Paul, Minn.) is applied on one surface of a 5"×1"×1.5" door stile substrate (pine). A 6"×1.125"×0.125" tempered door skin strip is place on the stile substrate such that the tempered surface of the strip is adhered on the stile substrate through the adhesive. Aligning the door skin strip so that it is overhang the stile substrate by one inch. Pressing the specimen by applying a pressure of from 50 to 70 psi to it for sixty (60) minutes. Then, the specimen is mounted onto the Instron (5500R); and a cable attached to the load cell is fastened to the overhanging door skin tab. The Instron is started at a rate of two inches per minute. Recording maximum load each time and reporting the average maximum load of five samples. Percentage substrate failure (% ubstrate failure) is determined by visional inspection.

Adhesion Test

The adhesion of a Lilly doorskin primer to a tempered fiberboard is tested according to Test Method A and Test Method B, ASTM D 3359-93 Standard Test Method for Measuring Adhesion By Tape Test with the exception that the substrate is a ⅛""×6" medium density fiberboard having a specific gravity of about 1.0.

Tape Pull Test

The surface integrity of a tempered fiberboard is evaluated by the Tape Pull Test as follows.

A piece (approximately 1"×4") of pressure-sensitive adhesive tape (Scotch Brand No. 600 tape by 3M) is adhered with finger pressure to a tempered surface of a fiberboard, and then, removed by swinging hammer from an Izod impact tester. When the hammer removes the tape a pound reading is recorded.

Example 1

A tempering composition was prepared as follows:

To a reaction vessel were added under vacuum 33.5 wt % PAPI 94, a polymeric isocyanate from Dow Chemical Co. (Midland, Mich.), 16.38 wt % Voranol 220-056, a polyether polyol having less than about 0.05% water content from Dow Chemical Co., and 50.0 wt % Eastman TXIB, a plasticizer from Eastman Chemical Company (Kingsport, Tenn.). The temperature was raised to about 175° F. and the reaction was allowed to continue for about 2.5 hours. Upon completion of the reaction, the temperature of the vessel was cooled to about 104° F. 0.12 wt % Jeffcat™ DMDEE, a catalyst from Huntsman (Houston, Tex.) was added to the vessel and mixed for about 30 minutes. The resultant content of the vessel was discharged through 400 micron filter to obtain a tempering composition having % NCO by weight of about 10% and a viscosity of about 80 cps at 77° F.

The composition was applied onto both face surface and back surface of a medium density fiberboard from Masonite (Towanda, Pa.) by glass rod and cured at about 73° F. and 50% relative humidity for about 24 hours.

The tempered fiberboard was glued to pine with RK8490 and cured for two hours, and then was subjected to the doorskin cleavage test, the tap pull test and the adhesion test. The tape pull test shows a tape pull value of 29.2 lb. The door skin cleavage test and the adhesion test results are listed in Table I and Table III, respectively, in comparison with a non-tempered fiberboard as comparative example A, and a conventional linseed oil tempered fiberboard as comparative example B.

TABLE I

| Ex. No. | Doorskin Cleavage Strength (lb.) | % Substrate Failure |
|---|---|---|
| Com. A | 4.79 | 100% thin fiber failure |
| Com. B | 8.46 | 80–100% substrate failure (tab broke) |
| Ex. 1 | 8.87 | 80–100% substrate failure (tab broke) |

Example 2

A tempering composition was prepared using the same procedure as Example 1 with the exception that 53.66 wt % instead of 33.5 wt % PAPI 94, 26.22 wt % instead of 16.38 wt % Voranol 220-056, and 20.0 wt % instead of 50.0 wt % Eastman TXIB were used, and that the composition was cured for about 1 week.

The tempering composition obtained has % NCO by weight of about 16% and a viscosity of about 250 cps at 77° F.

The doorskin cleavage test result is listed in Table II in comparison with a non-tempered fiberboard as comparative example C and a conventional linseed oil tempered fiberboard as comparative example D.

Example 3

A tempering composition was prepared using the same procedure as Example 2 with the exception that Poly G 55-56 EO capped from Arch (Norwalk, Conn.) instead of Voranol 220-056 was used.

The tempering composition obtained has % NCO by weight of about 16% and a viscosity of about 250 cps at 77° F.

The door skin cleavage test result is listed in Table II.

Example 4

A tempering composition was prepared using the same procedure as Example 2 with the exception that Agent 2229-34, a polyester polyol from Stepan (Northfield, Ill.) instead of Voranol 220-056 was used.

The tempering composition obtained has % NCO by weight of about 16%.

The door skin cleavage test result is listed in Table II.

Example 5

A tempering composition was prepared using the same procedure as Example 2 with the exception that Poly G 20-56, a polyether polyol from Arch (Norwalk, Conn.) instead of Voranol 220-056 was used.

The tempering composition obtained has % NCO by weight of about 16% and a viscosity of about 250 cps at 77° F.

The door skin cleavage test result is listed in Table II.

TABLE II

| Ex. No. | Doorskin Cleavage Strength (lb.) | % Substrate Failure |
|---|---|---|
| Com. C | 3.682 | 100% thin fiber failure |
| Com. D | 8.328 | 80–100% substrate failure (tab broke) |
| Ex. 2 | 11.708 | 80–100% substrate failure (tab broke) |
| Ex. 3 | 11.081 | 80–100% substrate failure (tab broke) |
| Ex. 4 | 10.924 | 80–100% substrate failure (tab broke) |
| Ex. 5 | 10.782 | 80–100% substrate failure (tab broke) |

Examples 6 and 7

Tempering compositions were prepared using the same procedure as Example 1 with the exception that 0.5% TX-100, a surfactant from Union Carbide Corp. (Danbury, Conn.) was added in Example 6, and that castor oil was used instead of Voranol 220-056 in Example 7.

The adhesion test results are listed in Table III.

TABLE III

| Ex. No. | X-cut (Method A) | Cross-cut (Method B) |
|---|---|---|
| Com. A | 0A | 0B |
| Com. B | 4A– | 3B |
| Ex. 1 | 4A | 3B |
| Ex. 6 | 4A | 3B |
| Ex. 7 | 4A | 3B |

We claim:

1. A method of tempering fiberboard to reinforce the surface(s) of said fiberboard, comprising:

a) applying a substantially solvent-free, liquid tempering composition on at least one surface of said fiberboard, said tempering composition comprising at least one thermoset material and having a viscosity at application temperature sufficiently low to allow said tempering composition to penetrate into fiber structure of said fiberboard; and b) curing said tempering composition to obtain a tempered fiberboard exhibiting a door skin cleavage strength of at least about 8 lb.

2. The method of claim 1, wherein said thermoset material is selected from the group consisting of moisture cure thermoset resins, two-part polyurethane, two-part epoxy resins, two-part acrylates, and UV curable resins.

3. The method of claim 2, wherein said moisture cure thermoset resins comprises one-part moisture cure polyurethane.

4. The method of claim 1, wherein said tempered fiberboard exhibits a door skin cleavage strength of at least about 9 lb.

5. The method of claim 1, wherein said tempering composition has a viscosity of no greater than about 10,000 cps at 77° F.

6. The method of claim 5, wherein said tempering composition has a viscosity of no greater than about 3,000 cps at 77° F.

7. The method of claim 1, wherein said tempering composition further comprises at least one viscosity modifier.

8. The method of claim 7, wherein said tempering composition comprises from about 30 wt % to about 60 wt % of said viscosity modifier.

9. The method of claim 3, wherein said tempering composition has % NCO of from about 1% to about 15%.

10. The method of claim 9, wherein said tempering composition has % NCO of from about 5% to about 10%.

11. The method of claim 1, wherein said tempering composition further comprises at least one catalyst.

12. The method of claim 1, wherein said tempering composition is applied at a temperature of from about ambient temperature to about 250° F.

13. The method of claim 1, wherein said tempering composition is applied and cured at ambient temperature.

14. The method of claim 1, wherein said fiberboard comprises at least one face surface and at least one back surface, said tempering composition being applied on said face surface and said back surface of said fiberboard.

15. The method of claim 1, wherein said tempering composition comprises no greater than about 5.0 g/l volatile organic component.

16. The method of claim 1, wherein said tempering composition is applied in an amount of at least about 1.0 g/ft$^2$.

17. The method of claim 14, wherein said tempering composition is applied on said face surface in an amount of from about 1.5 g/ft$^2$ to about 3.0 g/ft$^2$.

18. The method of claim 14, wherein said composition is applied on said back surface in an amount of from about 4.0 g/ft$^2$ to about 5.0 g/ft$^2$.

19. A fiberboard produced by the method of claim 1.

20. A fiberboard produced by the method of claim 3.

21. The tempering method of claim 1, wherein said curing is carried out at application temperature of from about ambient temperature to about out-of-press temperature.

* * * * *

UNITED STATES PATENT AND TRADEMARK OFFICE
CERTIFICATE OF CORRECTION

PATENT NO.    : 6,451,384 B1
DATED         : September 17, 2002
INVENTOR(S)   : Benjamin E. Burrows and Albert M. Giorgini It is certified that error appears in the above-identified patent and that said Letters Patent is hereby corrected as shown below:

<u>Column 4,</u>
Line 25, "stoichoemetic ratio" should be -- stoichiometric ratio --

<u>Column 6,</u>
Line 46, "(% ubstrate failure)" should be -- (% substrate failure) --

Signed and Sealed this

Twenty-ninth Day of April, 2003

JAMES E. ROGAN
*Director of the United States Patent and Trademark Office*